(12) United States Patent
Lai et al.

(10) Patent No.: US 7,828,444 B2
(45) Date of Patent: Nov. 9, 2010

(54) PROJECTION APPARATUS

(75) Inventors: Sheng-Tang Lai, Hsinchu (TW); Jiun-Shiun Wang, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 615 days.

(21) Appl. No.: 11/779,293

(22) Filed: Jul. 18, 2007

(65) Prior Publication Data
US 2008/0074625 A1 Mar. 27, 2008

(30) Foreign Application Priority Data
Sep. 21, 2006 (TW) .............................. 95134929 A (51) Int. Cl.
*G03B 21/00* (2006.01)
*G03B 21/14* (2006.01)
(52) U.S. Cl. ........................................ 353/33; 353/101
(58) Field of Classification Search ............ 353/30–34, 353/94, 101, 71, 81, 82; 349/7–9, 96, 97, 349/108, 117; 250/208.1, 216, 222.1, 231.13–231.18, 250/237 G, 237 R, 221
See application file for complete search history.

(56) References Cited
U.S. PATENT DOCUMENTS
6,814,450 B2 * 11/2004 Kim .............................. 353/94

2006/0103815 A1 * 5/2006 Peterson ....................... 353/88

FOREIGN PATENT DOCUMENTS

| CN | 1403846 | 3/2003 |
|----|---------|--------|
| JP | 2005-77715 | 3/2005 |

* cited by examiner

*Primary Examiner*—Georgia Y Epps
*Assistant Examiner*—Don Williams
(74) *Attorney, Agent, or Firm*—Jianq Chyun IP Office (57) ABSTRACT

A projection apparatus including an illumination system, a light valve, a first optical element, a first projection lens, and a second projection lens is provided. The illumination system is suitable to provide an illumination beam, and the light valve is disposed on a transmission path of the illumination beam. The light valve is suitable to convert the illumination beam into an image beam. The first optical element is disposed on a transmission path of the image beam. A portion of the image beam is reflected by the first optical element, and a remaining portion of the image beam passes through the first optical element. The first projection lens is disposed on a transmission path of the image beam passing through the first optical element, and the second projection lens is disposed on a transmission path of the image beam reflected by the first optical element.

10 Claims, 7 Drawing Sheets

PROJECTION APPARATUS

CROSS-REFERENCE TO RELATED APPLICATION

This application claims the priority benefit of Taiwan application serial no. 95134929, filed Sep. 21, 2006. All disclosure of the Taiwan application is incorporated herein by reference.

BACKGROUND OF THE INVENTION

1. Field of the Invention

The present invention relates to a display apparatus, and more particularly, to a projection apparatus.

2. Description of Related Art

Figure 1:
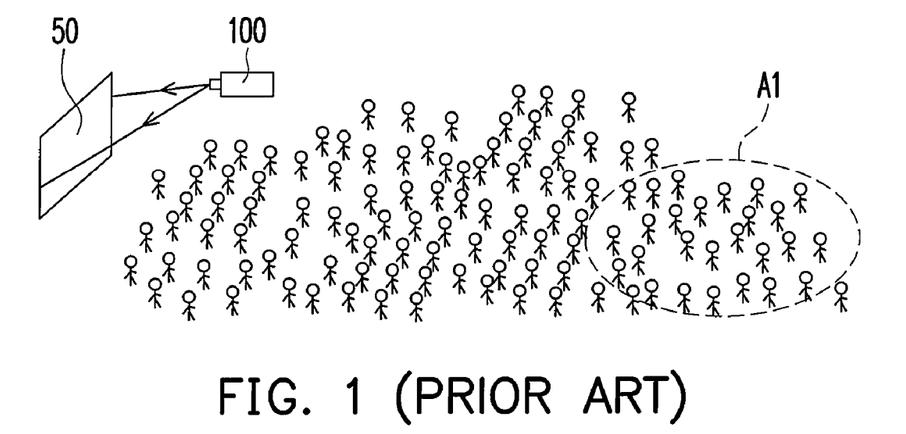
FIG. 1 is a schematic view of a conventional projection apparatus for use in a large conference venue.
Figure 2:
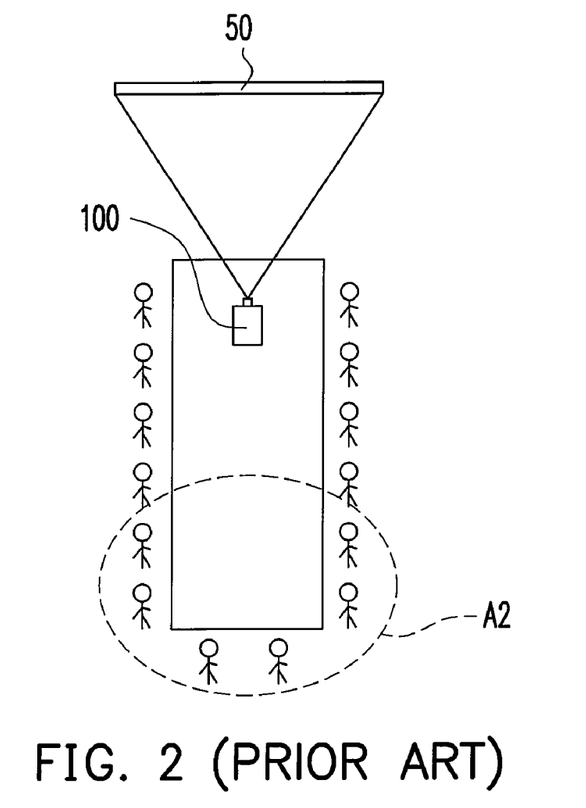
FIG. 2 is a schematic view of a conventional projection apparatus for use in a meeting room.

A conventional projection apparatus 100 can only project one image in one direction for viewing. However, in a large conference venue (as shown in FIG. 1), a large number of people attends the conference, and people far away from the screen 50 (e.g., people in the region A1) cannot clearly see an image projected by the projection apparatus 100 onto the screen 50. Moreover, in a meeting room (as shown in FIG. 2), not only those far away from the screen 50 cannot clearly see the image projected by the projection apparatus 100 onto the screen 50, but also some people must view the screen 50 at certain angles, thus feel uncomfortable when viewing.

Figure 3:
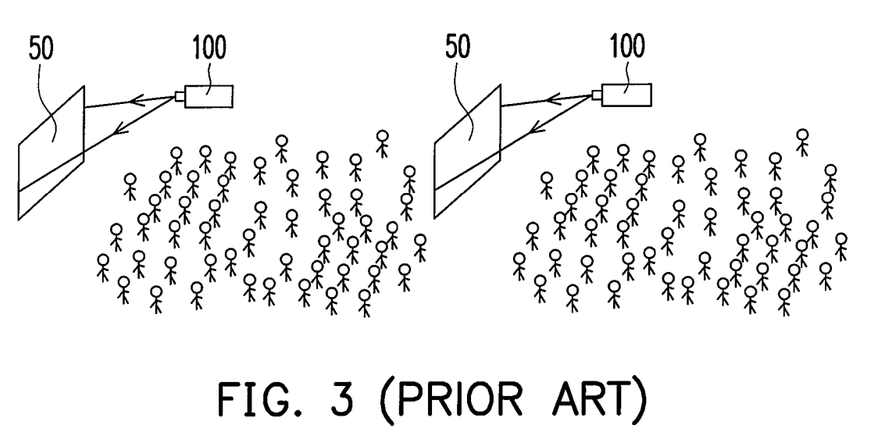
FIG. 3 is a schematic view of a conventional scheme of using two projection apparatuses in a large conference venue.
Figure 4:
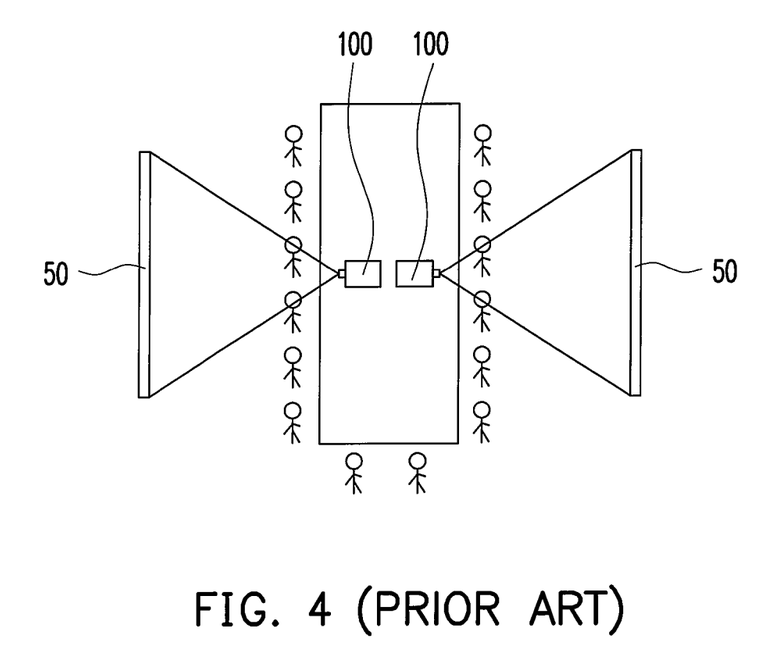
FIG. 4 is a schematic view of a conventional scheme using two projection apparatuses in a meeting room.

In order to solve the above problems, conventionally, more than two projection apparatuses 100 are arranged in the large conference venue (as shown in FIGS. 3 and 4). However, this arrangement would increase cost.

Figure 5:
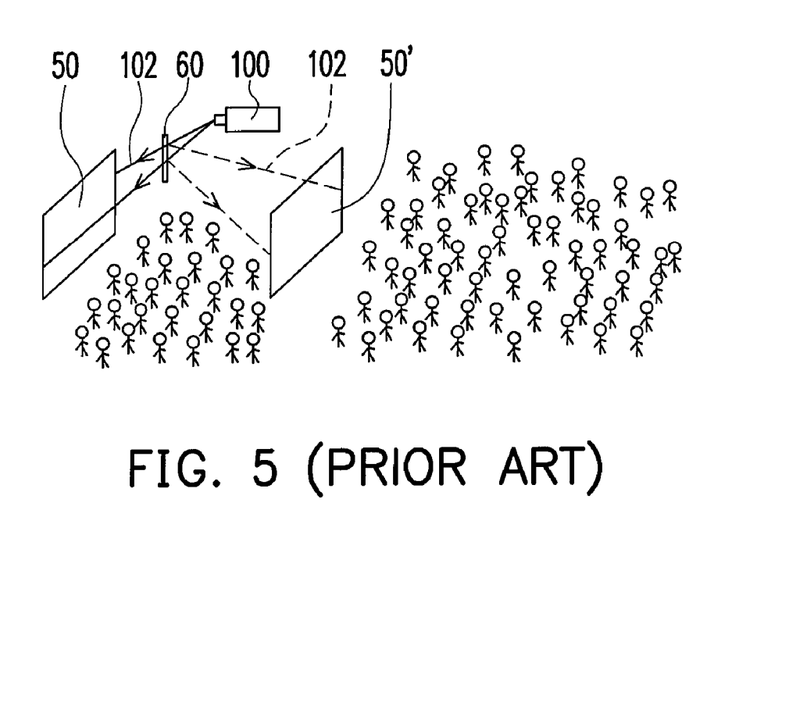
FIG. 5 is a schematic view of a conventional scheme using one projection apparatus for projecting an image onto two screens.

Referring to FIG. 5, in consideration of the cost, a beam splitter 60 is additionally disposed between the projection apparatus 100 and the screen 50, so that a portion of an image beam 102 projected by the projection apparatus 100 pass through the beam splitter 60 and is projected onto the screen 50, and the other portion of the image beam 102 is reflected onto another screen 50'. However, as the image beam 102 outside the projection apparatus 100 has a large divergence angle, a large-sized beam splitter 60 is required, and also a supporting structure for the beam splitter 60 is added, thus occupying a considerable space. Moreover, under this architecture, the distance between the screen 50 and the screen 50' is limited, which causes inconvenience in use. And, the images on the two screens cannot be focused simultaneously, resulting in a blurred image on one of the screens.

SUMMARY OF THE INVENTION

Accordingly, the present invention provides a projection apparatus having a bi-directional projection function.

In order to achieve the above and other objectives, a projection apparatus including an illumination system, a light valve, a first optical element, a first projection lens, and a second projection lens is provided. The illumination system is suitable to provide an illumination beam, and the light valve is disposed on a transmission path of the illumination beam. Also, the light valve is suitable to convert the illumination beam into an image beam. The first optical element is disposed on a transmission path of the image beam. A portion of the image beam is reflected by the first optical element, and a remaining portion of the image beam passes through the first optical element. The first projection lens is disposed on a transmission path of the image beam passing through the first optical element, and the second projection lens is disposed on a transmission path of the image beam reflected by the first optical element.

A projection apparatus including an illumination system, a light valve, a first optical element, a first projection lens, and a second projection lens is further provided. The illumination system is suitable to provide an illumination beam, and the light valve is disposed on a transmission path of the illumination beam. Also, the light valve is suitable to convert the illumination beam into an image beam. The first optical element is disposed on a transmission path of the image beam, and the first optical element comprises a body and a driving device connected to the body. The body has a reflecting portion, a light splitting portion, and a light-transmission portion, and the driving device is suitable to drive the body to intersect one of the reflecting portion, the light splitting portion, and the light-transmission portion on the transmission path of the image beam. When the reflecting portion intersects the transmission path of the image beam, the image beam is reflected by the reflecting portion. When the light splitting portion intersects the transmission path of the image beam, a portion of the image beam is reflected by the light splitting portion and the other portion of the image beam passes through the light splitting portion. When the light-transmission portion intersects the transmission path of the image beam, the image beam passes through the light-transmission portion. Furthermore, the first projection lens is disposed on a transmission path of the image beam passing through the first optical element, and the second projection lens is disposed on a transmission path of the image beam reflected by the first optical element.

In the present invention, as a portion of the image beam can pass through the first optical element and is then transmitted to the first projection lens, and the other portion of the image beam is reflected by the first optical element to the second projection lens, the projection apparatus of the present invention has a bi-directional projection function.

Other objectives, features and advantages of the present invention will be further understood from the further technology features disclosed by the embodiments of the present invention wherein there are shown and described preferred embodiments of this invention, simply by way of illustration of modes best suited to carry out the invention.

DESCRIPTION OF EMBODIMENTS

Figure 6:
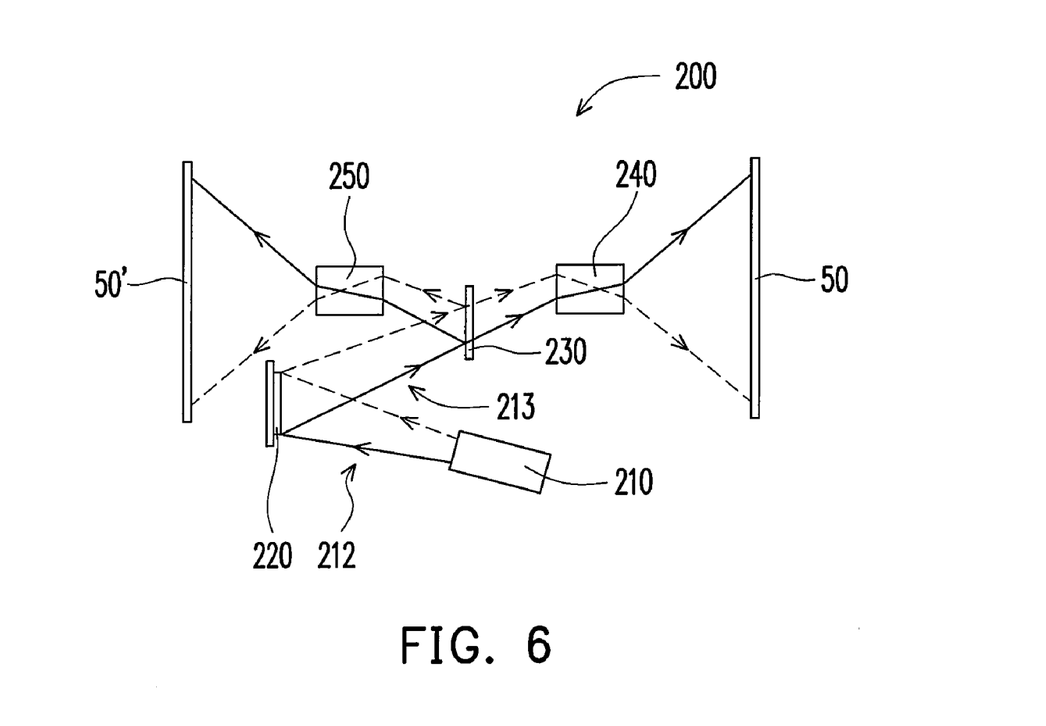
FIG. 6 is a schematic view of a projection apparatus according to an embodiment of the present invention.

FIG. 6 is a schematic view of a projection apparatus according to an embodiment of the present invention. Referring to FIG. 6, a projection apparatus 200 in this embodiment includes an illumination system 210, a light valve 220, a first optical element 230, a first projection lens 240, and a second projection lens 250. The illumination system 210 is suitable to provide an illumination beam 212, and the light vale 220 is disposed on a transmission path of the illumination beam 212. Also, the light valve 220 is suitable to convert the illumination beam 212 into an image beam 213. The first optical element 230 is disposed on a transmission path of the image beam 213. A portion of the image beam 213 is reflected by the first optical element 230, and a remaining portion of the image beam 213 passes through the first optical element 230. The first projection lens 240 is disposed on a transmission path of the image beam 213 passing through the first optical element 230, and the second projection lens 250 is disposed on a transmission path of the image beam 213 reflected by the first optical element 230.

In this embodiment, the illumination system 210 includes a light source (not shown) for providing the illumination beam 212. The illumination beam 212 provided by the light source is projected onto the light valve 220 after passing through optical elements (such as a lens and an integrated column) inside the illumination system 210. The light valve 220 can be a transmissive light valve or a reflective light valve, wherein the transmissive light valve can be a transmissive liquid crystal panel and the reflective light valve can be a digital micromirror device (DMD) or a liquid crystal on silicon panel (LCOS panel). The reflective light valve is taken as an example as shown in FIG. 6. After converting the illumination beam 212 into the image beam 213, the light valve 220 reflects the image beam 213 to the first optical element 230. The first optical element 230 is, for example, a beam splitter, which can reflect a portion of the beam and allow the other portion of the beam passing therethrough. In particular, the first optical element 230 is a beam splitter with a transmittance of 50% and a reflectance of 50%. Thus, when the image beam 213 is transmitted to the first optical element 230, a portion of the image beam 213 passes through the first optical element 230 and is then transmitted to the first projection lens 240, while the other portion of the image beam 213 is reflected by the first optical element 230 to the second projection lens 250. Moreover, the first projection lens 240 and the second projection lens 250 can project the image beam 213 onto the screen 50 and the screen 50' respectively, so as to respectively form an image on the screen 50 and the screen 50'.

Because the image beam 213 can be projected onto different screens via the first projection lens 240 and the second projection lens 250, the projection apparatus 200 in this embodiment has a bi-directional projection function, thereby saving the cost of adding additional projection apparatuses. Moreover, the first projection lens 240 and the second projection lens 250 can be focused respectively, so the images on the screen 50 and the screen 50' are clear. Furthermore, the distance between the screen 50 and the screen 50' is not limited herein, so it is convenient in use.

In this embodiment, the first projection lens 240 and the second projection lens 250 with different focal length can be used, so as to provide various throw ratios of the projection apparatus 200. In this manner, a desired picture size can be obtained with the same projection distance. Additionally, as the first optical element 230 is disposed within the projection apparatus 200, the first optical element 230 does not need to have a large size. Compared with the architecture of the projection apparatus 100 of FIG. 5 with the beam splitter 60, the architecture of the projection apparatus 200 in this embodiment is obviously smaller.

It should be noted that although in the projection apparatus 200 described above, the first projection lens 240 and the second projection lens 250 project face opposite directions, a reflection element can be additionally arranged within the projection apparatus according to the present invention, so as to change arrangement projection direction and position of the first projection lens 240 and/or the second projection lens 250, and the details will be illustrated in the following embodiments.

Figure 7A:
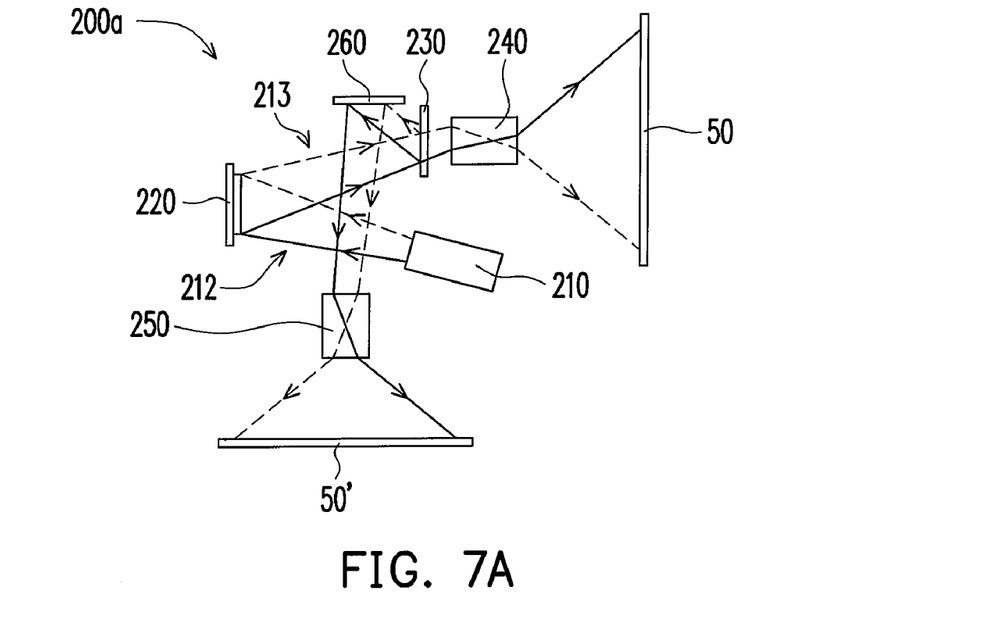
FIGS. 7A and 7B are schematic views of projection apparatuses according another two embodiments of the present invention.
Figure 7B:
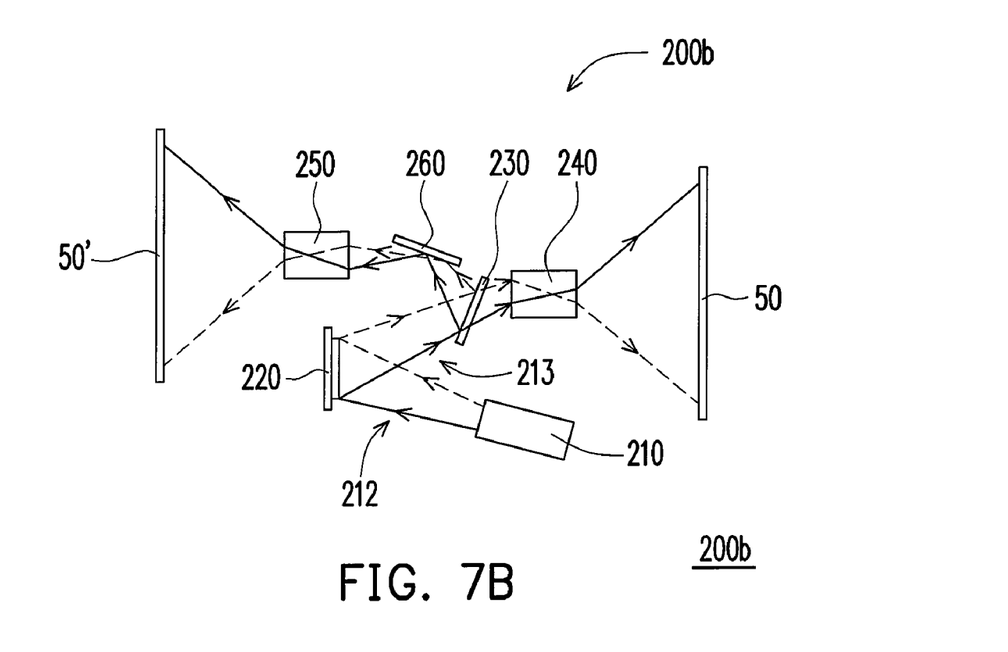

FIGS. 7A and 7B are schematic views of projection apparatuses according to another two embodiments of the present invention. Referring to FIGS. 7A and 7B, compared with the projection apparatus 200, projection apparatuses 200a, 200b respectively further include a reflection element 260 disposed on the transmission path of the image beam 213 reflected by the first optical element 230 so as to reflect the image beam 213 transmitted thereon to the second projection lens 250. In other words, by arranging the reflection element 260 and adjusting arrangement angles of the reflection element 260 and the first optical element 230, the second projection lens 250 can be arranged at a desired position to meet the requirement for the projection direction of the second projection lens 250.

It should be noted that the number of the reflection elements 260 is not limited in this embodiment, i.e., a plurality of reflection elements 260 can be additionally arranged within the projection apparatus to achieve the purpose of arranging the second projection lens 250 at a desired position. Moreover, the reflection element 260 can also be disposed on the transmission path of the image beam 213 passing through the first optical element 230, so as to reflect the image beam 213 transmitted thereon to the first projection lens 240. In this manner, the first projection lens 240 can be arranged at a desired position, thereby meeting the requirements for the projection direction of the first projection lens 240.

Figure 8:
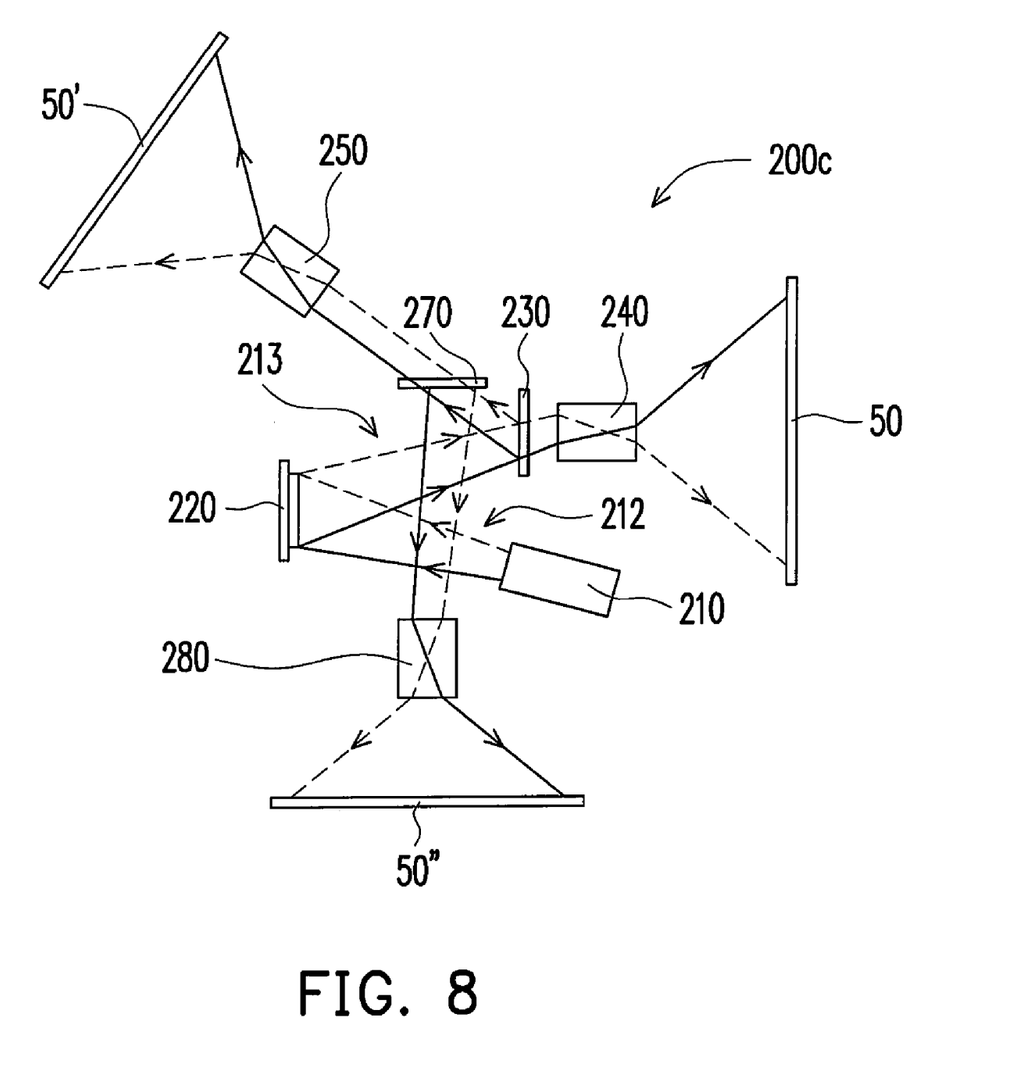
FIG. 8 is a schematic view of a projection apparatus according to still another embodiment of the present invention.

FIG. 8 is a schematic view of a projection apparatus according to still another embodiment of the present invention. Referring to FIG. 8, compared with the projection apparatus 200 of FIG. 6, a projection apparatus 200c in this embodiment further includes a second optical element 270 and a third projection lens 280. The second optical element 270 is disposed on the transmission path of the image beam 213 reflected by the first optical element 230. A portion of the image beam 213 is reflected by the second optical element 270 to transmit to the third projection lens 280, and a remaining portion of the image beam 213 passes through the second optical element 270 to transmit to the second projection lens 250.

The first optical element 230 and the second optical element 270 are both, for example, beam splitters. In order to achieve the same brightness of the images projected by the first, second, and third projection lenses 240, 250, and 280, the first optical element 230 can be a beam splitter with a transmittance of 33% and a reflectance of 67%, and the second optical element 270 can be a beam splitter with a transmittance of 50% and a reflectance of 50%.

In this embodiment, besides the first projection lens 240 and the second projection lens 250 used to project the image beam 213 onto the screen 50 and the screen 50' respectively, the third projection lens 280 can also be used to project the image beam 213 onto a screen 50", and thus the projection apparatus 200c has a three-directional projection function. Furthermore, in this embodiment, more projection lenses and optical elements capable of reflecting a portion of the beam and allowing the other portion of the beam passing therethrough can be additionally arranged within the projection apparatus 200c, so as to achieve the purpose of multi-directional projection. Additionally, the second optical element 270 can also be disposed on the transmission path of the image beam 213 passing through the first optical element 230. In this case, a portion of the image beam 213 is reflected by the second optical element 270 to transmit to the third projection lens 280, and a remaining portion of the image beam 213 passes through the second optical element 270 to transmit to the first projection lens 240. Those of ordinary skill in the art can easily deduce from the above description, and the details will not be repeated.

Figure 9A:
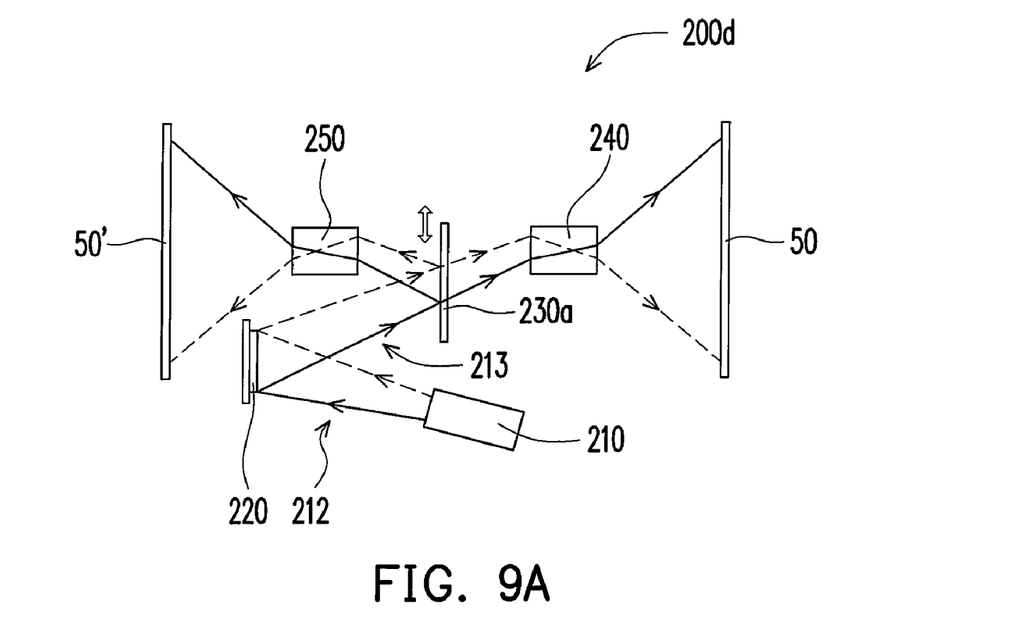
FIG. 9A is a schematic view of a projection apparatus according to yet another embodiment of the present invention.
Figure 9B:
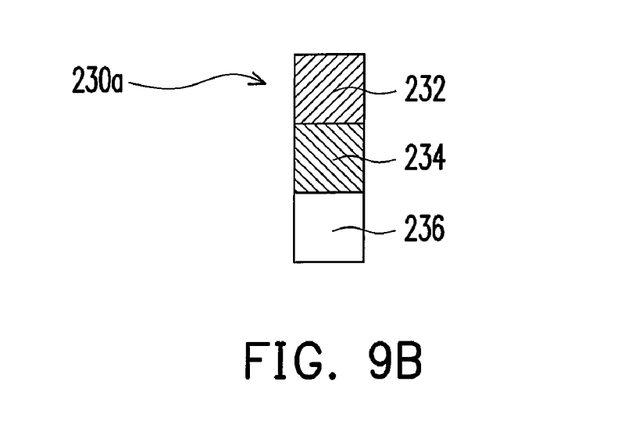
FIG. 9B is a schematic view of the first optical element in FIG. 9A.

FIG. 9A is a schematic view of a projection apparatus according to yet another embodiment of the present invention, and FIG. 9B is a schematic view of the first optical element in FIG. 9A. Referring to FIGS. 9A and 9B, a projection apparatus 200d in this embodiment is similar to the projection apparatus 200 of FIG. 6, with a difference in the first optical element. In particular, a first optical element 230a of the projection apparatus 200d includes a body and a driving device connected to the body (not shown). The body has a reflecting portion 232, a light splitting portion 234, and a light-transmission portion 236, and the driving device is suitable to drive the body to intersect one of the reflecting portion 232, the light splitting portion 234, and the light-transmission portion 236 on the transmission path of the image beam 213. The driving device may be a moving element (not shown) so as to drive the body to move relative to the light valve 220. Furthermore, the light-transmission portion 236 is, for example, a transparent substrate, and the transparent substrate can be coated with an anti-reflection coating layer so as to avoid light reflection. The reflecting portion 232 is, for example, a reflection mirror. The light splitting portion 234 is, for example, a beam splitter. Moreover, the first projection lens 240 is disposed on the transmission path of the image beam 213 passing through the first optical element 230a, and the second projection lens 250 is disposed on the transmission path of the image beam 213 reflected by the first optical element 230a.

In this embodiment, the projection direction of the projection apparatus 200d can be adjusted by moving the first optical element 230a. In particular, when the reflecting portion 232 is intersected on the transmission path of the image beam 213, the image beam 213 is reflected by the reflecting portion 232 to the second projection lens 250, and at this time, the image beam 213 only can be projected onto the screen 50' via the second projection lens 250. If the light splitting portion 234 is intersected on the transmission path of the image beam 213, a portion of the image beam 213 is reflected by the light splitting portion 234 to the second projection lens 250, and the other portion of the image beam 213 passes through the light splitting portion 234 and is then transmitted to the first projection lens 240, and at this time, the image beam 213 can be projected onto the screen 50 and the screen 50' simultaneously via the first projection lens 240 and the second projection lens 250. When the light-transmission portion 236 intersects the transmission path of the image beam 213, the image beam 213 can pass through the light-transmission portion 236 and is then transmitted to the first projection lens 240, and at this time the image beam 213 only can be projected onto the screen 50 via the first projection lens 240.

Figure 10:
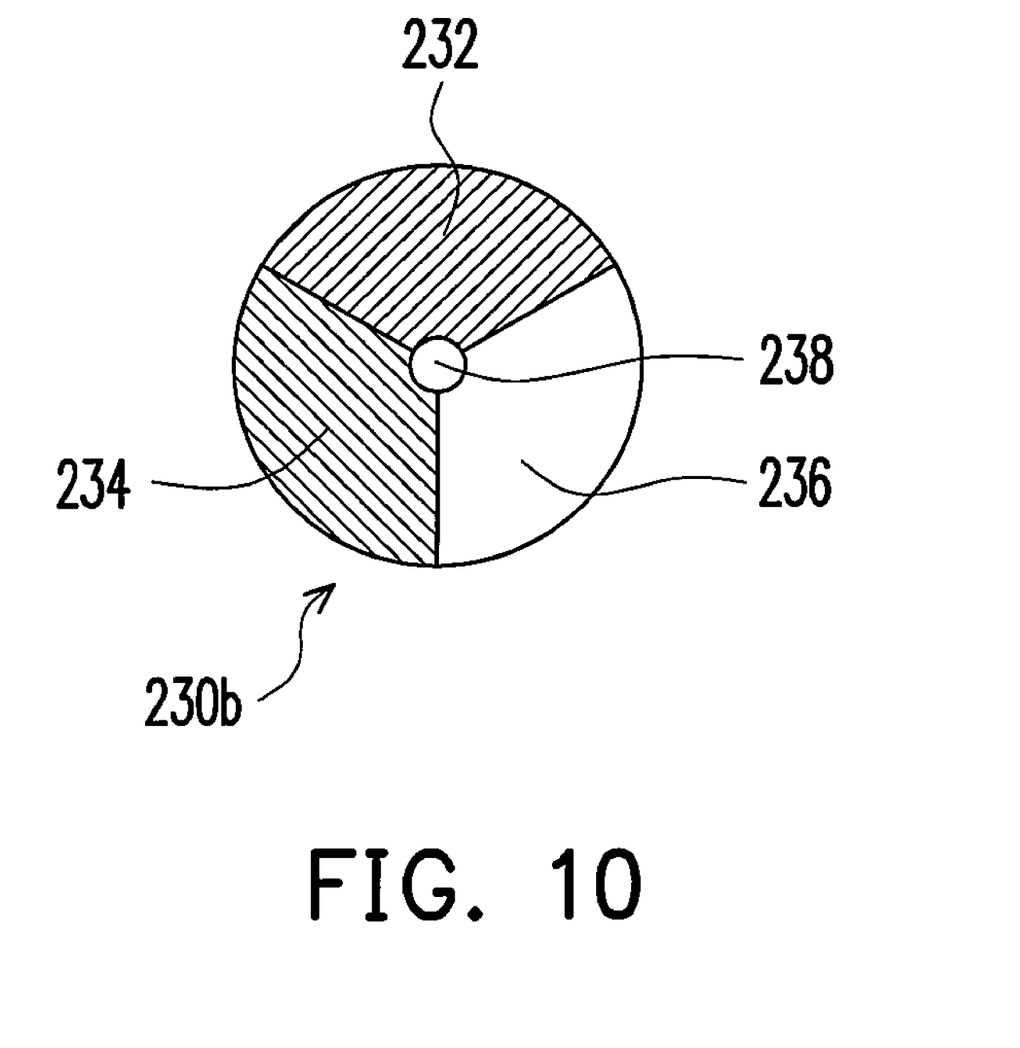
FIG. 10 is a schematic view of another first optical element according to the present invention.

FIG. 10 is a schematic view of another first optical element according to the present invention. Referring to FIG. 10, the first optical element 230a of the projection apparatus 200d described above can also be replaced by a first optical element 230b of FIG. 10. The first optical element 230b includes a body and a driving device connected to the body. The body includes a reflecting portion 232, a light splitting portion 234, and a light-transmission portion 236. The driving device is, for example, a motor 238 which is suitable to drive the body to rotate therewith so as to intersect one of the reflecting portion 232, the light splitting portion 234, and the light-transmission portion 236 on the transmission path of the image beam 213. By rotating the first optical element 230b, it is possible to control the reflecting portion 232, the light splitting portion 234, or the light-transmission portion 236 intersecting the transmission path of the image beam, such that the projection direction of the projection apparatus 200d can be adjusted. The reflecting portion 232 is, for example, a reflection mirror, and the light splitting portion 234 is, for example, a beam splitter.

In view of the above, the projection apparatus of the present invention has at least one or more of the following advantages:

1. As an image beam can be projected onto different screens via a first projection lens and a second projection lens, the projection apparatus of the present invention has a bi-directional projection function.

2. The focuses of the first projection lens and the second projection lens can be adjusted respectively, and thus the images projected onto two screens can be adjusted to be clear.

3. By arranging the first projection lens and the second projection lens with different focal length, the projection apparatus can be provided with various throw ratios.

4. In the present invention, more number of projection lenses and optical elements capable of reflecting a portion of the beam and allowing the other portion of the beam to pass there-through can be additionally arranged within the projection apparatus, so as to achieve the purpose of multi-directional projection.

5. In an embodiment, as the first optical element is a moving element having a reflecting portion, a light splitting portion, and a light-transmission portion, the projection direction of the projection apparatus can be adjusted by moving the first optical element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
an illumination system, for providing an illumination beam;
a light valve, disposed on a transmission path of the illumination beam, for converting the illumination beam into an image beam;
a first optical element, disposed on a transmission path of the image beam, a portion of the image beam reflected by the first optical element, a remaining portion of the image beam passing through the first optical element;
a first projection lens, disposed on a transmission path of the image beam passing through the first optical element for projecting the image beam passing through the first optical element onto a first screen; and
a second projection lens, disposed on a transmission path of the image beam reflected by the first optical element for projecting the image beam reflected by the first optical element onto a second screen, wherein a position of the first screen is different from a position of the second screen.

2. The projection apparatus as claimed in claim 1, wherein the first optical element is a beam splitter.

3. The projection apparatus as claimed in claim 1, further comprising a reflection element disposed on the transmission path of the image beam reflected by the first optical element so as to reflect the image beam transmitted thereon to the second projection lens.

4. The projection apparatus as claimed in claim 1, further comprising a reflection element disposed on the transmission path of the image beam passing through the first optical element so as to reflect the image beam transmitted thereon to the first projection lens.

5. The projection apparatus as claimed in claim 1, further comprising:
a third projection lens; and
a second optical element disposed on the transmission path of the image beam reflected by the first optical element, wherein a portion of the image beam is reflected by the second optical element to transmit to the third projection lens and a remaining portion of the image beam passes through the second optical element to transmit to the second projection lens.

6. The projection apparatus as claimed in claim 1, further comprising:
a third projection lens; and
a second optical element disposed on the transmission path of the image beam passing through the first optical element, wherein a portion of the image beam is reflected by the second optical element to transmit to the third projection lens, and a remaining portion of the image beam passes through the second optical element to transmit to the first projection lens.

7. A projection apparatus, comprising:
an illumination system, for providing an illumination beam;
a light valve, disposed on a transmission path of the illumination beam, for converting the illumination beam into an image beam;
a first optical element, disposed on a transmission path of the image beam, comprising a body and a driving device connected to the body, wherein the body comprises:
a reflecting portion;
a light splitting portion; and
a light-transmission portion, wherein the driving device is adopted to drive the body to intersect the reflecting portion, the light splitting portion or the light-transmission portion on the transmission path of the image beam;
wherein when the reflecting portion intersects the transmission path of the image beam, the image beam is reflected by the reflecting portion; when the light splitting portion intersects the transmission path of the image beam, a portion of the image beam is reflected by the light splitting portion and the other portion of the image beam passes through the light splitting portion; and when the light-transmission portion intersects the transmission path of the image beam, the image beam passes through the light-transmission portion;
a first projection lens, disposed on a transmission path of the image beam passing through the first optical element for projecting the image beam passing through the first optical element onto a first screen; and
a second projection lens, disposed on a transmission path of the image beam reflected by the first optical element for projecting the image beam reflected by the first optical element onto a second screen, wherein a position of the first screen is different from a position of the second screen.

8. The projection apparatus as claimed in claim 7, wherein the light-transmission portion comprises an anti-reflection coating layer.

9. The projection apparatus as claimed in claim 7, wherein the driving device is a moving element used to drive the body to move relative to the light valve, such that one of the reflecting portion, the light splitting portion, and the light-transmission portion intersects the transmission path of the image beam.

10. The projection apparatus as claimed in claim 7, wherein the driving device is a motor used to drive the body to rotate therewith, such that one of the reflecting portion, the light splitting portion and the light-transmission portion intersects the transmission path of the image beam.

* * * * *